(12) United States Patent
Alfaro et al.

(10) Patent No.: US 7,185,963 B1
(45) Date of Patent: Mar. 6, 2007

(54) ENHANCEMENT TECHNIQUE FOR ASYMMETRICAL PRINT RESOLUTION

(75) Inventors: Victor Alfaro, Sant Cugat del Vallés (ES); Pere Obrador, Mountain View, CA (US); Jordi Gonzalez, Sant Quirze del Valles (ES)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 09/495,886

(22) Filed: Feb. 1, 2000

(51) Int. Cl.
*B41J 2/205* (2006.01)
*G06K 1/00* (2006.01)

(52) U.S. Cl. ............ 347/15; 358/1.2; 358/1.9
(58) Field of Classification Search ........ 347/12, 347/15, 40, 41, 5, 43; 358/1.2, 1.8, 1.9, 296, 358/3.01, 3.03
See application file for complete search history.

(56) References Cited

U.S. PATENT DOCUMENTS

| | | | | |
|---|---|---|---|---|
| 4,437,122 A | * | 3/1984 | Walsh et al. | 348/625 |
| 5,160,577 A | * | 11/1992 | Deshpande | 216/27 |
| 5,270,728 A | * | 12/1993 | Lund et al. | 347/5 |
| 5,502,792 A | * | 3/1996 | Chen et al. | 358/1.8 |
| 5,574,832 A | * | 11/1996 | Towery et al. | 358/1.9 |
| 5,602,572 A | * | 2/1997 | Rylander | 347/15 |
| 5,677,714 A | * | 10/1997 | Klassen et al. | 347/9 |
| 5,742,300 A | * | 4/1998 | Klassen | 347/9 |
| 6,183,055 B1 | * | 2/2001 | Kanematsu et al. | 347/9 |
| 6,296,343 B1 | * | 10/2001 | Alfaro | 347/43 |

* cited by examiner

*Primary Examiner*—Lamson Nguyen
(74) *Attorney, Agent, or Firm*—Peter I. Lippman

(57) ABSTRACT

A sequence of steps for storing an image at a higher resolution in a rendering stage, and making a conversion of the image to a different asymmetrical print resolution. During the conversion corrections are made to avoid losing "on" pixels located on an eliminated row. In some embodiments, an initial narrowing step may occur along the axis of higher resolution and a final horizontal depletion may occur along a carriage scan axis.

18 Claims, 8 Drawing Sheets

Logical Operation

ENHANCEMENT TECHNIQUE FOR ASYMMETRICAL PRINT RESOLUTION

RELATED APPLICATIONS

This application is a continuation-in-part of the commonly owned previously copending Alfaro U.S. Pat. No. 6,296,343 filed 21 Oct. 1996 entitled EDGE ENHANCEMENT DEPLETION TECHNIQUE FOR OVER-SIZED INK DROPS TO ACHIEVE HIGH RESOLUTION X/Y AXES ADDRESSABILITY IN INKJET PRINTING.

BACKGROUND OF THE INVENTION

This invention relates to techniques for converting stored images of a first resolution into a printed image of a second different resolution.

BRIEF SUMMARY OF THE INVENTION

A technique provides a sequence of steps for storing an image at a higher resolution such as 1200×1200 dpi in a rendering stage, and making a conversion of the image to a different asymmetrical print resolution such as 1200×600 dpi.

An exemplary embodiment of the invention eliminates alternate rows from the higher resolution image, with corrections made for certain "on" pixels in the eliminated rows. A final step may provide for horizontal depletion of the printed image which preserves left and right edge pixels, while an initial step may provide a narrowing of the printed image along the axis of higher resolution.

DETAILED DESCRIPTION OF THE INVENTION

Figure 1A:
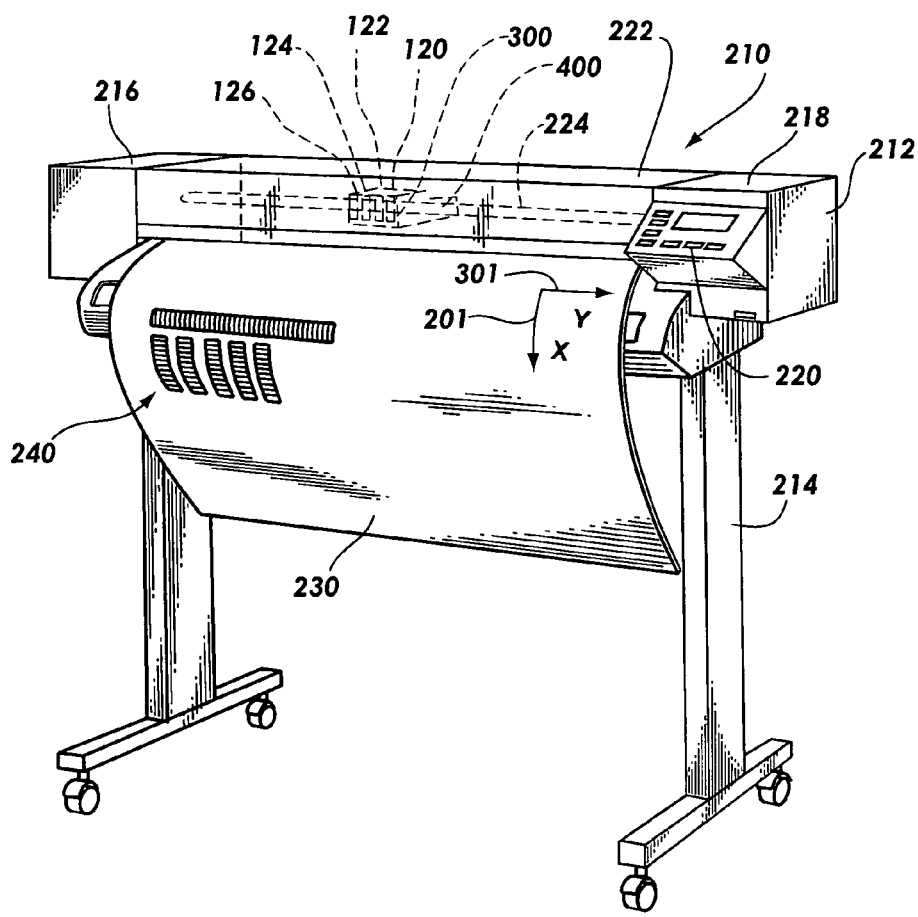
FIGS. 1A and 1B show a printer for implementing the invention.
Figure 1B:
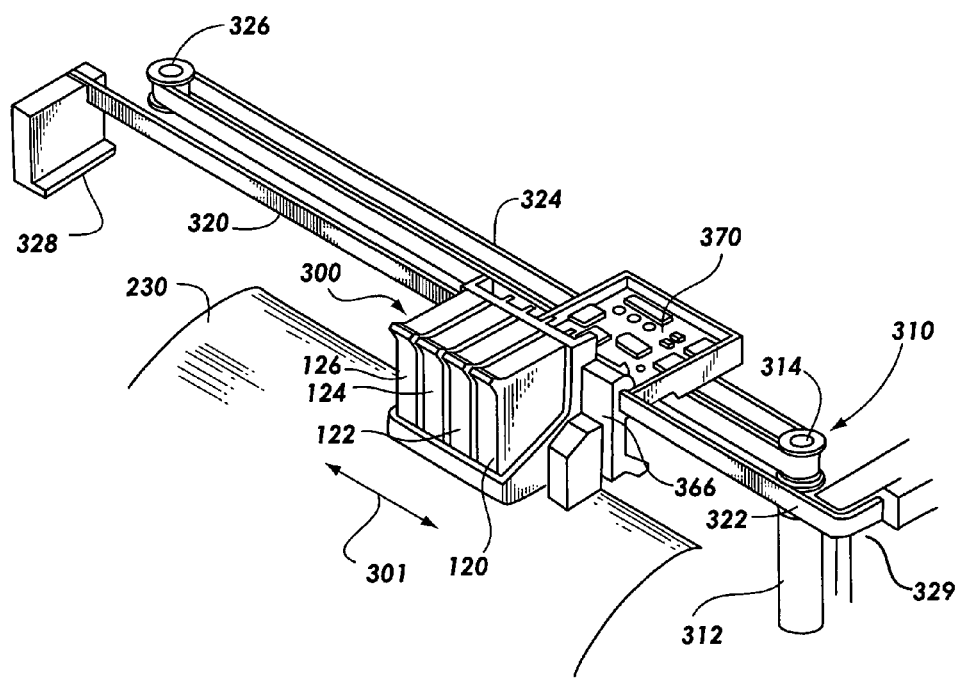

A typical embodiment of the invention is exemplified in a large format color inkjet printer/plotter as shown in FIGS. 1A–1B. More specifically, FIG. 1A is a perspective view of an inkjet printer/plotter 210 having a housing 212 mounted on a stand 214. The housing has left and right drive mechanism enclosures 216, 218. A control panel 220 is mounted on the right enclosure 218. A carriage assembly 300, illustrated in phantom under a cover 222, is adapted for reciprocal motion along a carriage bar 224, also shown in phantom. The position of the carriage assembly 300 in a horizontal or carriage scan axis is determined by a carriage positioning mechanism 310 with respect to an encoder strip 320 (see FIG. 1B). A print medium 230 such as paper is positioned along a vertical or media axis by a media axis drive mechanism (not shown). As used herein the media axis is called the X axis denoted as 201, and the carriage scan axis is called the Y axis denoted as 301. FIG. 1A FIG. 1B is a perspective view of the carriage assembly 300, the carriage positioning mechanism 310 and the encoder strip 320. The carriage positioning mechanism 310 includes a carriage position motor 312 which has a shaft 314 which drives a belt 324 which is secured by idler 326 and which is attached to the carriage 300.

The position of the carriage assembly in the scan axis is determined precisely by the encoder strip 320. The encoder strip 320 is secured by a first stanchion 328 on one end and a second stanchion 329 on the other end. An optical reader 366 is disposed on the carriage assembly and provides carriage position signals which are utilized by the invention to achieve optimal registration of images 240 in the manner described below.

Figure 2:
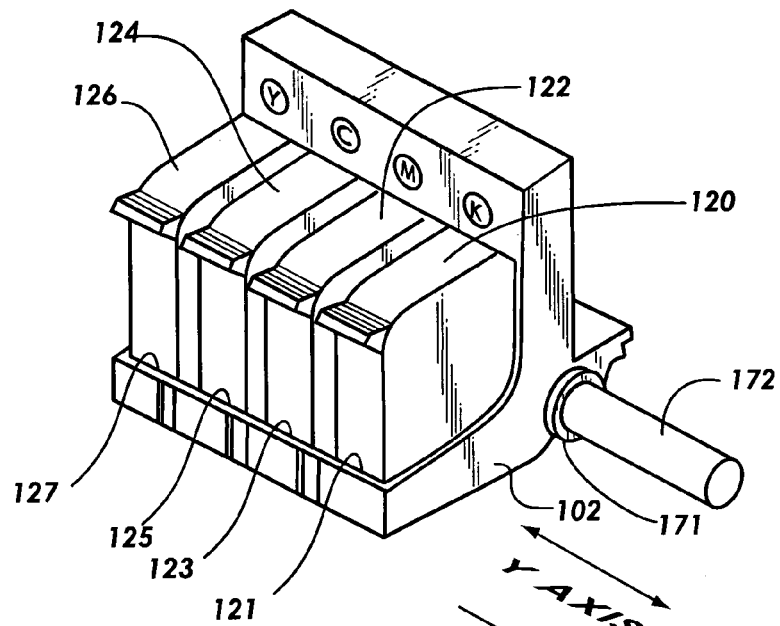
FIG. 2 shows a carriage for the printer of FIGS. 1A–1B.

Referring to FIG. 2, a carriage 102 is slidably mounted on support bar 172 through a bearing sleeve 171, and includes four slots 121, 123, 125, 127 for removably receiving four inkjet print cartridges. From right to left in the carriage slots are respectively mounted a black ink print cartridge 120, a magenta ink print cartridge 122, a cyan ink print cartridge 124 and a yellow ink print cartridge 126.

Figure 3:
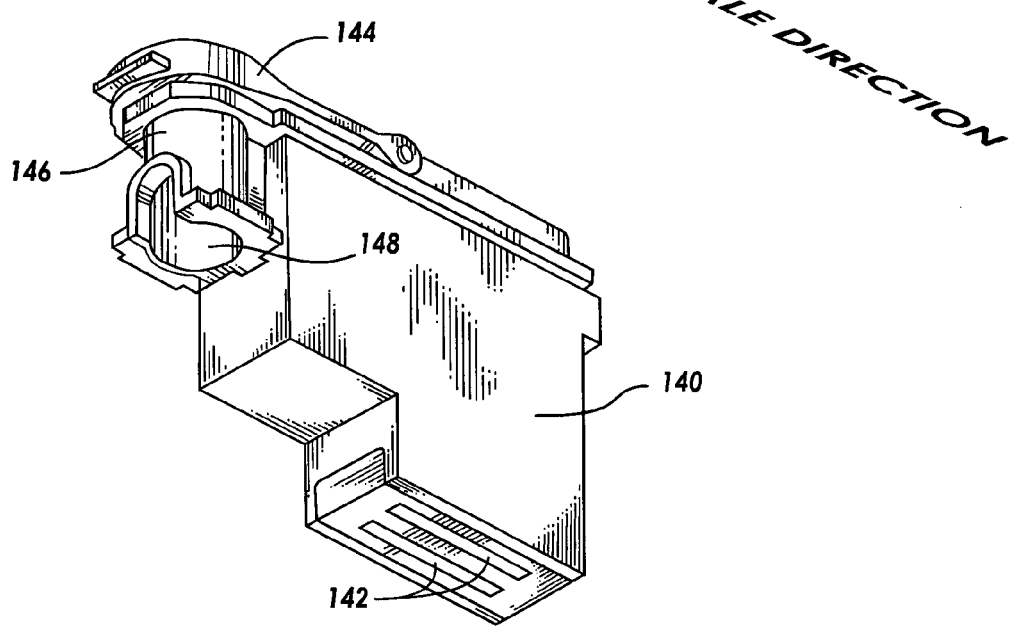
FIG. 3 shows a preferred print cartridge for the carriage of FIG. 2.

The enlarged perspective view of FIG. 3 shows an exemplary refillable print cartridge 140 with two columns of nozzles 142, a handle 144, and an ink inlet housing 146 having a receptacle 148 for receiving an ink supply coupler (not shown).

The invention has been successfully demonstrated with four 600 dpi print cartridges of the type shown in FIGS. 2 and 3. In a currently preferred embodiment the black ink cartridge has a 600 dpi nozzle pitch resolution and a printer incorporates the invention to print monochrome images with 600 dpi sized drops on an asymmetrical 1200×600 pixel grid.

A modified carriage (not shown) may carry a removably mounted black ink cartridge similar to 120, and a tri-compartment ink cartridge (not shown) which has separate ink reservoirs for cyan, magenta and yellow ink, respectively.

The embodiments described herein employ a new technique which allows an inkjet printer system to print A×B resolution monochrome bitmaps which A=B in a system where A dpi is addressable in the carriage scan axis and B/2 dpi is addressable in the media advance axis. Thus, the present system and methods may be used with asymmetrical sub-pixels that are only half as wide in the carriage scan direction as they are in the media advance direction.

The embodiments herein enable an inkjet printer system to utilize only the even width lines while preserving both edges without losing its ability to render one-pixel width lines. This enables it to keep the smallest detail in a bitmap image.

Figure 4A:
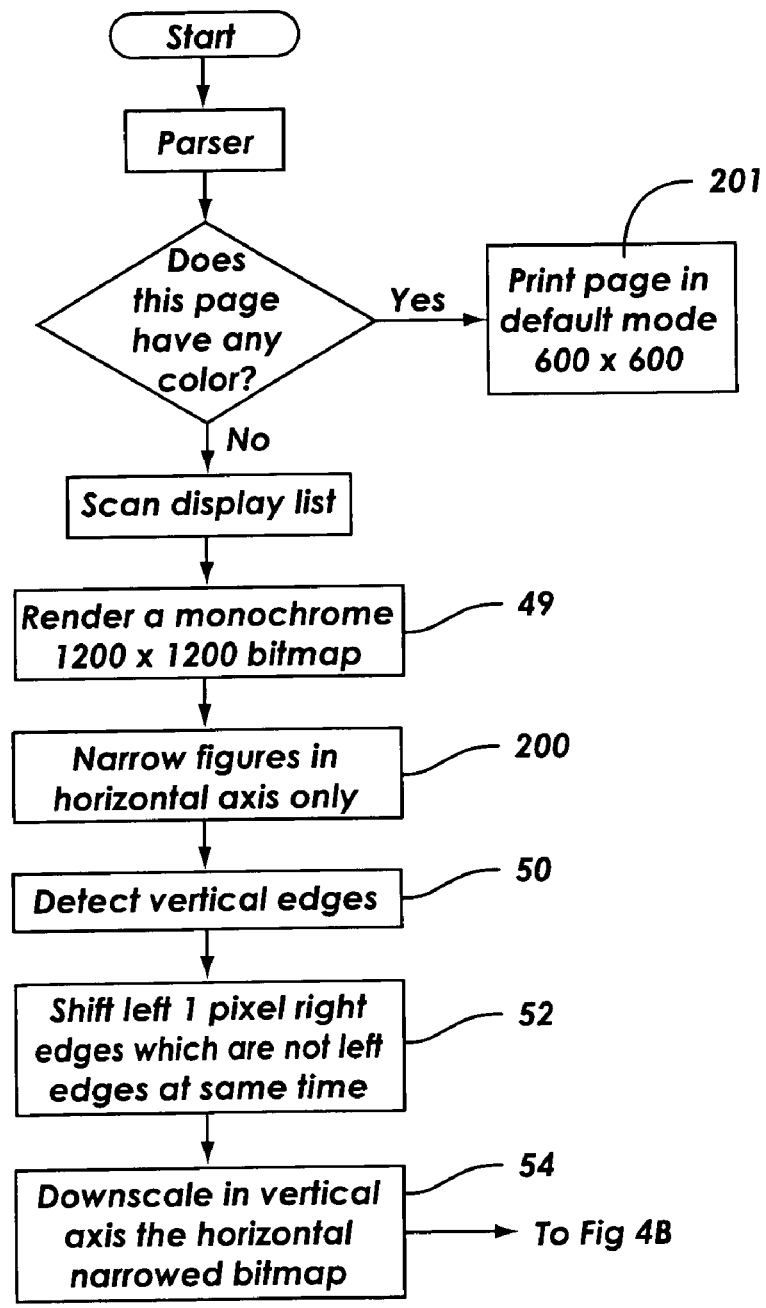
FIGS. 4A, 4B and 4C show a flow chart of a preferred embodiment of the invention.
Figure 4B:
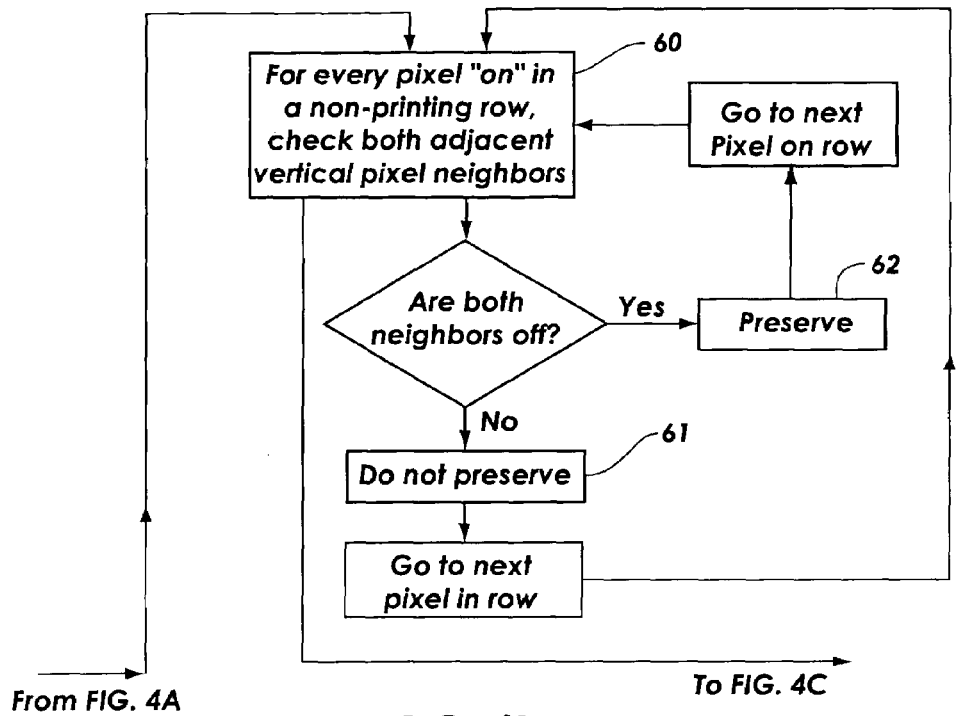
Figure 4C:
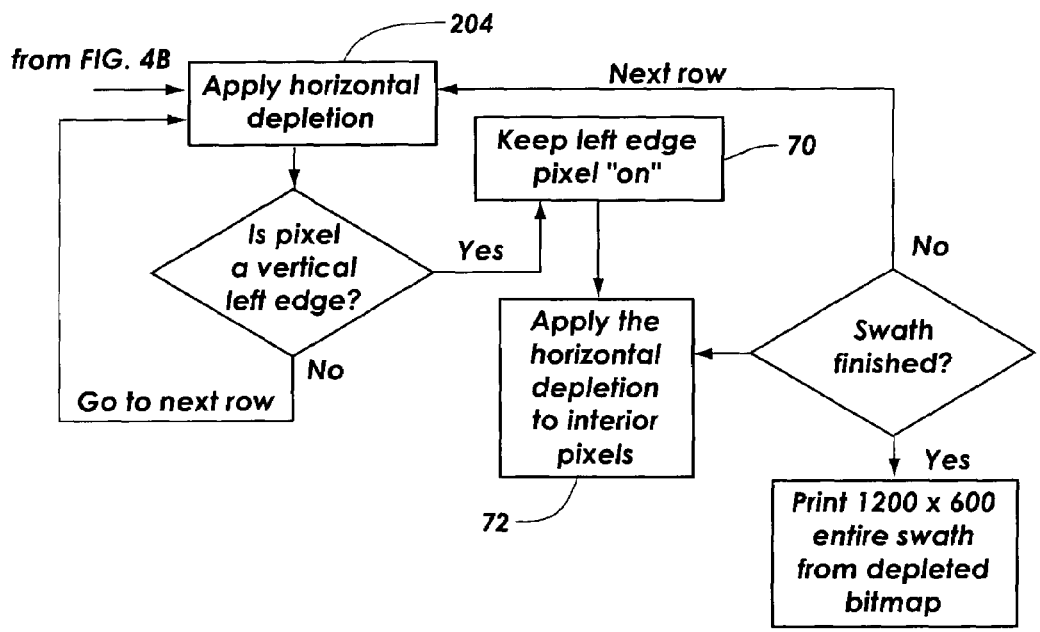
Figure 5:
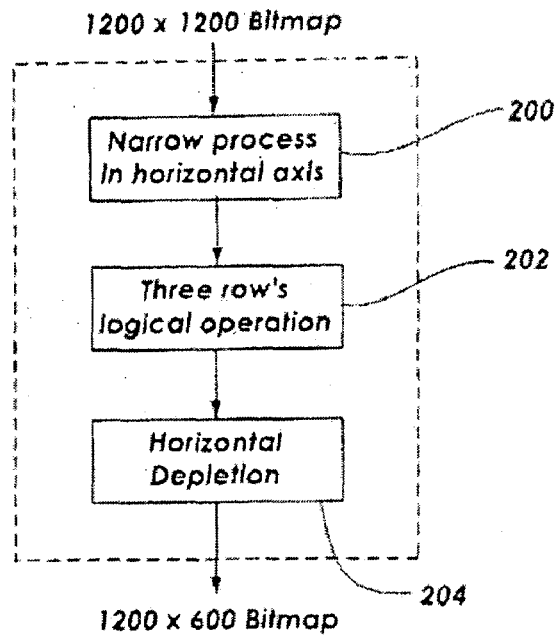
FIG. 5 is a block diagram corresponding to the flow chart of FIGS. 4A–4C.

The present systems and methods may be accomplished in the steps illustrated in FIGS. 4 and 5. As shown in FIG. 5, the present systems and methods may be accomplished in three sequential steps 200, 202, 204. First, as shown in FIG. 4A the A×B bitmap is processed by a narrowing process step 200 which in the exemplary embodiment comprises detecting the vertical edges (50), and then shifting one pixel distance to the left each right edge pixel which is not also a left edge pixel (52).

Referring again to FIG. 5, the next step is a logical combining 202 of rows of the pixel grid. In taking A to a A×A/2 bitmap for printing, a problem faced was that for certain images some horizontal rows would be lost and not shown on the final A×A/2 image. To solve this problem, several rows of data were taken together and a logical operation was performed on the rows such that no horizontal row would be removed while following through the process as shown and described in relation to FIGS. 4B, 6 and 7. The logical combination of rows 202 ensures that the resulting row from the operation will have information from at least one of the rows involved in the operation and that no information will be lost. The actual dot location is in the middle between nonpreserved and preserved rows (see FIG. 7).

The object of the logical combination step 202 is to downscale the raster (step 54) of the image (not reduce the ink) in the vertical axis without losing information. It is necessary with the present systems and methods to downscale in order to be able to work in an asymmetric writing system (where A/=B). Accordingly, the goals of this stage are different than other systems because the present embodiments are preparing a raster to be printed on an asymmetric system. Because the goals are different, the procedure also, as expected, will also be different.

In other systems two rows were worked with and processed at the same time.

In the present embodiments, there is no need to deplete in the vertical axis, because the system is only B=A/2 addressable. Accordingly, it is not possible to put double ink drops on the same pixel. With the present systems the goal for the vertical axis is then opposite of the other systems because with the present system, the logical combination step 202 serves to add pixels instead of deplete pixels. The logic combination step 202, in current design shown in detail in FIG. 4B works with three rows at the same time of a 1200×1200 bitmap image (see step 62) instead of two rows like some other systems have and currently do.

Figure 6:
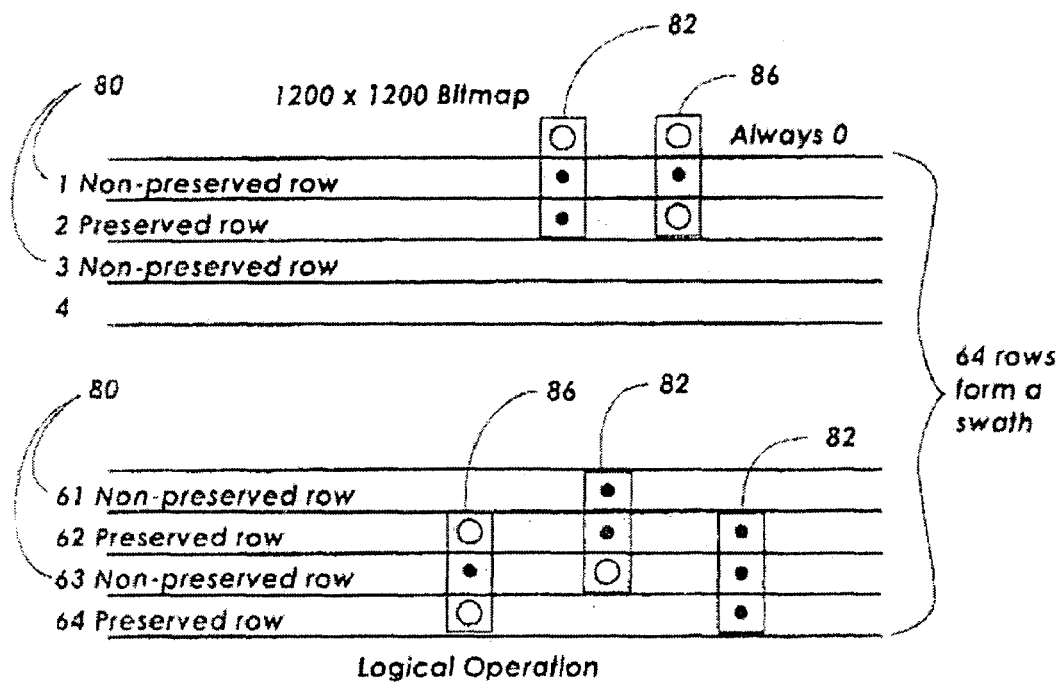
FIGS. 6–9 show examples of how the flow chart steps operate on vertical columns and horizontal rows of a stored image.

Referring to FIG. 6, a pixel in a non-preserved row 80 is ignored (step 61) when at least one vertical adjacent pixel is "on" (see comparison tables 82). Alternatively a pixel in a non-preserved row 80 is "preserved" (see step 62) when no vertical adjacent pixel is "on" (see comparison tables 86).

Figure 7:
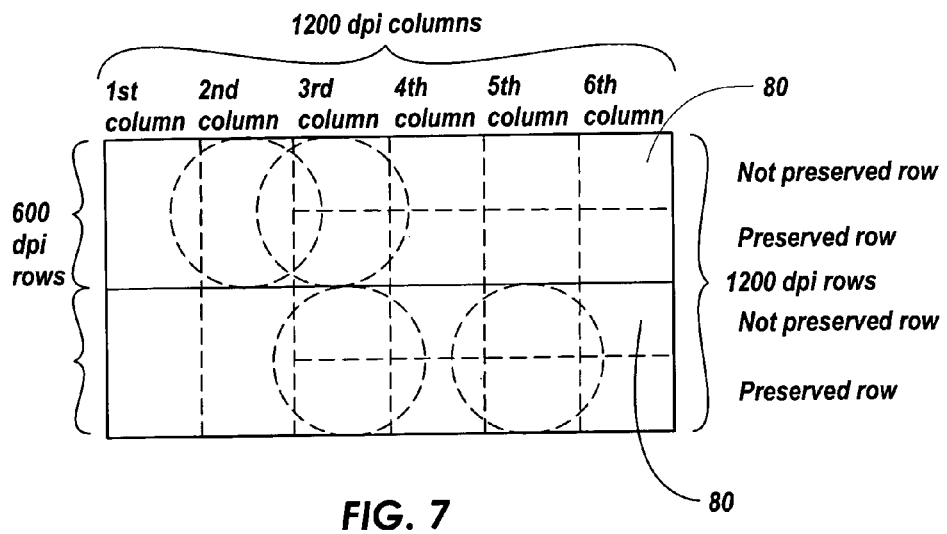

The present system identifies isolated objects which would be lost in a media advance axis direction, directly a result of having a lower media advance axis resolution which eliminates odd numbered pixel rows in the 1220× 1200 bit map (see FIG. 7). Then the present system acts to save the image and moves these isolated objects one row upward such that the isolated object will not be lost.

The final step as shown in FIG. 4C is a horizontal depletion step 204. This horizontal depletion step 204 is the same as some horizontal depletion methods described earlier except that the depletion is applied as a final step after the three row's logical operation step 202, and only in the horizontal direction, that is, only in the carriage scan axis and not in the media advance axis. The horizontal depletion 204 saves each vertical left edge pixel (step 70), depletes alternate interior pixels (step 72) and thus preserved both the right and left vertical edges 74, 76 and the horizontal edges (see FIG. 8).

By using this method and steps as described, the present embodiments are able to assume and store a 1200×1200 image in the rendering stage and produced a 1200×600 dpi image for the writing stage without losing any resolution for one-pixel width lines. Of course, the 1200 dpi is in the scan axis and the 600 dpi is in the paper axis.

Figure 8:
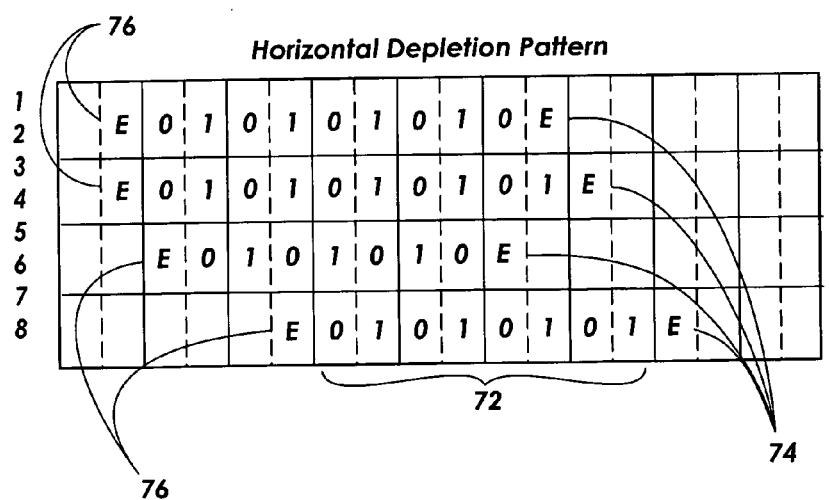
Figure 9:
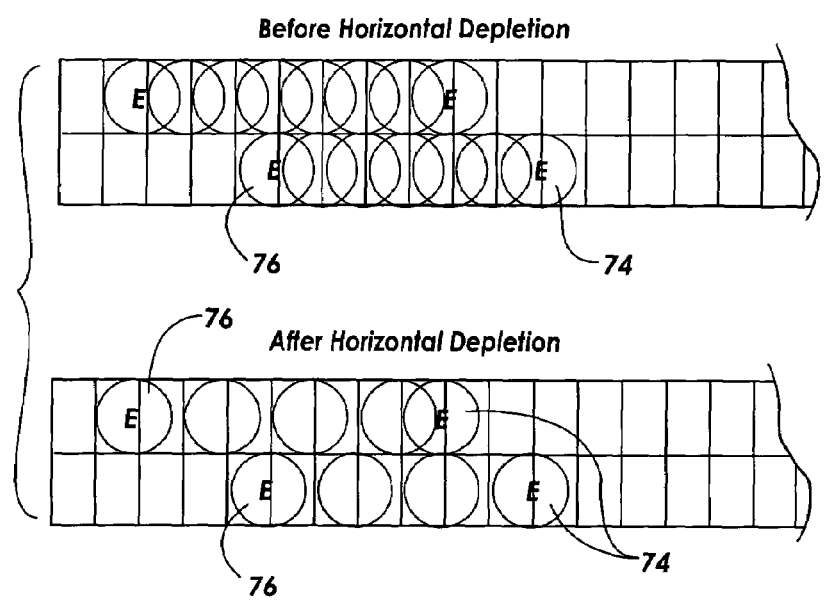

The operation of the horizontal depletion technique is shown in FIGS. 8 and 9.

We claim:

1. A technique for bilevel printing of an image or figure comprising:

providing an inkjet printhead having a nozzle pitch of a first resolution;

creating a higher resolution bitmap which resolution is greater than the first resolution;

eliminating certain selected alternate pixel rows entirely from the printed rows of higher resolution bitmap by converting the higher resolution bitmap into a downscaled lower resolution bitmap having a reduced number of preserved rows available for printing, said preserved rows including "on" pixels added from the eliminated non-printing rows to help avoid losing image details; and printing the downscaled lower resolution bitmap onto an asymmetrical pixel grid having the first resolution in one axis and the higher resolution in a second axis.

2. The technique of claim 1 wherein said converting includes applying a narrowing process only in the axis of higher resolution by shifting and preserving any vertical edge pixels of the figure.

3. The technique of claim 1 wherein said converting includes applying a logical operation on certain rows of the higher resolution bitmap to determine whether or not to preserve any "on" pixels which are in the eliminated alternate pixel rows as a result of printing onto the asymmetrical pixel grid.

4. The technique of claim 3 wherein said applying includes applying a logical operation on one of the eliminated alternate pixel rows and its two adjacent rows of the higher resolution bitmap.

5. The technique of claim 4 wherein the logical operation is applied to preserve and transfer an "on" pixel from an eliminated row to an adjacent non-eliminated row in the event there is a predetermined number of "off" pixels on the two adjacent rows of said eliminated row.

6. The technique of claim 5 wherein the logical operation is applied to an individual pixel on an eliminated row and to individual pixels on two vertically adjacent rows.

7. The technique of claim 5 wherein the logical operation is applied to an individual pixel on an eliminated row and to vertically adjacent individual pixels on both an upper and lower vertically adjacent row, respectively.

8. The technique of claim 1 wherein said first resolution is approximately 600 dpi.

9. The technique of claim 8 wherein said asymmetrical pixel grid is approximately 600 dpi in the media advance axis and approximately 1200 dpi in the carriage scan axis.

10. The technique of claim 1 wherein said first resolution in the one axis is approximately one half of said higher resolution in the second axis.

11. The technique of claim 10 wherein the second axis of said higher resolution extends in a scanning axis direction of the inkjet printhead.

12. The technique of claim 1 wherein said higher resolution bitmap has a resolution which is a multiple of said first resolution.

13. The technique of claim 1 wherein said converting includes applying an interior depletion pattern in the axis of higher resolution and a different edge depletion pattern prior to printing.

14. A method of achieving high quality printing from one or more printheads having a given nozzle pitch resolution, comprising:

creating a first symmetrical bitmap having a resolution which is a multiple of the given nozzle pitch resolution;

transforming the first bitmap by eliminating certain entire pixel rows from said first symmetrical bitmap in order to create a downscaled asymmetrical bitmap having a reduced number of preserved rows available for printing on an asymmetrical pixel grid having a higher resolution in a carriage scan axis and a lower resolution in a media advance axis, said preserved rows including "on" pixels added from the eliminated non-printing rows to help avoid losing image details; and performing a logical operation on an eliminated non-printing pixel row and two of its adjacent preserved pixel rows in order to select said "on" pixels to be transferred from the eliminated non-printing pixel row and added as a replacement for an "off" pixel in one of said two adjacent pixel rows to help avoid losing image details.

15. The method of claim 14 wherein said transforming includes applying an interior depletion pattern in the axis of higher resolution and a different edge depletion pattern prior to printing.

16. The method of claim 14 wherein said transforming includes applying a narrowing process only in the axis of higher resolution.

17. A printing system comprising:

one or more print cartridges having a given print resolution;

a carriage for mounting the one or more print cartridges;

motor means for scanning the carriage across a print medium; and a writing system for downscaling raster data from a high resolution A=B bitmap to a lower resolution asymmetrical bitmap where A is not equal to B by completely eliminating certain linear sequences of printed pixel rows such as selected non-adjacent pixel rows resulting in a modified bitmap with a reduced number of remaining preserved pixel rows to be printed, wherein said writing system also performs a logical operation comparing "on" pixels in the eliminated non-printing rows with "off" pixels in selected adjacent remaining preserved rows in order to preserve and transfer certain "on" pixels from an eliminated non-printing row to a remaining preserved row for printing by the cartridges on the print medium.

18. The printing system of claim 17 wherein the given print resolution of the print cartridges is less than the high resolution of the A=B bitmap.

* * * * *

UNITED STATES PATENT AND TRADEMARK OFFICE
CERTIFICATE OF CORRECTION

PATENT NO. : 7,185,963 B1
APPLICATION NO. : 09/495886
DATED : March 6, 2007
INVENTOR(S) : Victor Alfaro et al.

It is certified that error appears in the above-identified patent and that said Letters Patent is hereby corrected as shown below:

In column 2, lines 39-40, after "respectively." insert -- Color images may be printed in a 600×600 dpi default mode (see step 201 in Fig. 4A). --.

In column 2, line 64, after "taking" delete "A to a" and insert -- an A×A bitmap and converting to an --, therefor.

In column 3, line 32, delete "(see step 62)" and insert -- (see step 49) --, therefor.

In column 3, line 54, delete "preserved" and insert -- preserves --, therefor.

In column 3, line 55, delete "76 and" and insert -- 76, and also --, therefor.

In column 4, line 45, in Claim 9, after "dpi in" delete "the" and insert -- a --, therefor.

In column 4, line 46, in Claim 9, after "dpi in" delete "the" and insert -- a --, therefor.

Signed and Sealed this

Twenty-fifth Day of November, 2008

JON W. DUDAS
*Director of the United States Patent and Trademark Office*